US000001053H

United States Statutory Invention Registration [19]

[11] Reg. Number: H1053

Coffey et al. [43] Published: May 5, 1992

[54] COMPOSITION AND METHOD OF FORMING EXTRUDABLE FOOD ITEMS

[75] Inventors: Donald G. Coffey, Midland, Mich.; Donald A. Rebstock, Saint Simons Island, Ga.; Wilfred C. Meyer, Midland, Mich.

[73] Assignee: The Dow Chemical Company, Midland, Mich.

[21] Appl. No.: 485,817

[22] Filed: Feb. 26, 1990

Related U.S. Application Data

[63] Continuation-in-part of Ser. No. 274,888, Nov. 22, 1988, abandoned.

[51] Int. Cl.[5] ..... A23L 1/05; A23L 1/06; A01J 1/00; A23P 1/00

[52] U.S. Cl. ..... 426/573; 426/516

[58] Field of Search ..... 426/573, 89, 276, 516

[56] References Cited

U.S. PATENT DOCUMENTS

| | | | |
|---|---|---|---|
| 3,114,639 | 1/1963 | Rivoche | 99/100 |
| 3,650,765 | 3/1972 | Smadar et al. | 99/100 |
| 3,650,766 | 3/1972 | Smadar | 99/100 |
| 3,676,158 | 7/1972 | Fischer et al. | 99/166 |
| 4,168,325 | 9/1979 | Gonzalez et al. | 426/573 |
| 4,436,759 | 3/1984 | Trilling et al. | 426/573 |

OTHER PUBLICATIONS

Whistler, Roy L. ed., *Industrial Gums, Polysaccharides and Their Derivatives,* 1973, pp. 116–117.

Derwent, Profile ID 11446Z, Query No. 001, Gur-'yanov, V. E., Oct. 30, 1986, Patent CASCT.

*Primary Examiner*—Brooks H. Hunt
*Assistant Examiner*—Daniel J. Jenkins
*Attorney, Agent, or Firm*—John R. Schenian; Michael L. Glenn; Richard G. Waterman

[57] ABSTRACT

A method of making a new food product which comprises carboxymethylcellulose, a gelling binder, food particles and typically other batter-like ingredients. The method comprises mixing carboxymethylcellulose, a gelling binder and the batter-like ingredients to form a food matrix, which is admixed with food particles and water to form a food mash. This food mash is extruded into a desirous shape and is contacted with an aluminum solution. Further processing the food product can be done by battering, or breading and the like. The food product does not have a gel-like coating encasing it, so it has very appealing textural characteristics. Additional advantages are that carboxymethylcellulose is readily available, is not temperature sensitive and is not expensive.

24 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITION AND METHOD OF FORMING EXTRUDABLE FOOD ITEMS

CROSS-REFERENCE TO RELATED APPLICATION

This is a continuation-in-part of application Ser. No. 07/274,888, filed Nov. 22, 1988, now abandoned.

BACKGROUND OF THE INVENTION

This invention relates to edible products and a method of manufacturing such products, such that the product can have a variety of shapes and sizes without particular regard to the original food's shape or textural characteristics.

Mass production of convenience foods that are uniform in shape and size is difficult. Such food products are made by forming an extrudable food slurry containing alginates and extruding the slurry into a desired shape. The shaped food product is exposed to an alkaline earth ion solution, thereby forming a gel-like skin around the extrudated product. The gel-like skin is formed by subjecting alginates to the action of alkaline earth ions at the surface of the extruded food product. The skin encases the food product, thereby protecting the food slurry. Thus, different food shapes can be extruded.

There are several problems with this method. One problem is that although a skin encases the food product, the skin is not very durable so the extruded food products break more easily at transfer points, and therefore causes the extruded food products to be of irregular shapes and sizes. In addition, alginates have sensory and textural characteristics which are unappealing, due to the sliminess that is associated with the skin. There is also difficulty in using alginates because they are derived from seaweed and therefore are not readily available. Alginates are also very temperature sensitive, which hinders their use in mass production.

Thus, it would be desirable to make edible products that are texturally acceptable, durable, and of uniform size and shape. Ideally, the ingredients would be readily available and would not be temperature sensitive.

SUMMARY OF THE INVENTION

The invention is a new food composition and method of making shaped food products. The new method comprises:

(a) blending a composition that comprises carboxymethylcellulose, a gelling binder and food particles to form a food mash composition;

(b) extruding the food mash into a desired shape; and (c) exposing the extruded food product to an aluminum solution such that the shaped food product does not contain a gel-like skin.

Ingredients such as flour, sugar, starch, flavorings, etc. can also be added to the food mash. The method could further comprise applying an edible coating such as batters, breadings, and the like to the extruded food shape. Typically in the food industry, the food products are repeatedly batter breaded, although any of the food preparation techniques known in the art could be used.

The extruded food composition containing the carboxymethylcellulose when contacted with an aluminum solution does not form a skin or gel-like coating encasing the extruded food product, but is very stable and has appealing textural characteristics. Because the extruded food composition is stable or durable, many different shapes and sizes can be extruded. Additionally, an added advantage to using this method and composition is that the ingredients, in particular carboxymethylcellulose, are readily available, are not temperature sensitive and are not expensive.

DETAILED DESCRIPTION OF THE INVENTION

This invention is a new food composition and method of making shaped foods, wherein the new composition comprises an effective amount of carboxymethylcellulose, comminuted food particles, and a gelling binder. The composition is extruded into shaped form and is contacted with an aluminum solution.

It has been found that when an extruded food composition containing carboxymethylcellulose, more particularly sodium carboxymethylcellulose, is contacted with aluminum ions the resulting food product will not have a gel-like coating around it, but will be very stable and have textural characteristics which are appealing.

The carboxymethylcellulose gel that arises upon treatment with aluminum ions is stable in the sense that a continuous gel forms throughout the body of the extruded article. This therefore gives rise to an article with 3-dimensional structure or stability without freezing or cooking.

Carboxymethylcellulose-based extrusions are believed to crosslink with trivalent cations at a much slower rate than alginate-based extrusions. Therefore, the kinetics of the carboxymethylcellulose system allow the soluble aluminum ions to diffuse throughout the extrusion before the crosslinking reactions can prevent their penetration. The resulting 3-dimensional gel is a more open configuration than the alginate-based products. The carboxymethylcellulose gel membranes enclose pockets of the extruded food mixture throughout the body of the extruded item.

The matrix composition is made by admixing carboxymethylcellulose or a salt of carboxymethylcellulose, with a gelling binder and other batter-like ingredients to form a homogeneous blend. The composition is mixed with minced or finely chopped food particles and water to form a food mash.

Generally, the gelling binder is a cellulose ether. The cellulose ether could include methylcellulose, hydroxypropyl methylcellulose and methylethylcellulose. Preferably, the cellulose ether is methylcellulose. More particularly, methylcellulose has from about 27.5 to about 31.5 methoxyl substitution. The hydroxypropyl methylcellulose has from about 19.0 to about 30.0 weight percent methoxyl substitution and from about 4 to about 12 weight percent hydroxypropyl substitution.

Other batter-like ingredients that could be added to form the matrix composition include flour, starch, sugar, salt, flavorings, color, gums, sodium bicarbonate, cicid phosphates and the like. The food composition could contain from about 1.0 to about 5 weight percent carboxymethylcellulose, from about 6 to about 12 weight percent starch, from about 10 to about 14 weight percent flour, from greater than zero to about 3 weight percent sugar, from greater than zero to about 2 weight percent salt and from about 0.25 to about 2 weight percent cellulose ether.

More preferably, the matrix composition contains from about 1 to about 3 weight percent carboxymethylcellulose, about 8 to about 10 weight percent starch starch, from about 10 to about 11 weight percent flour, from about 0.5 to about 1.5 weight percent sugar, from about 0.5 to about 1.5 weight percent salt, and from about 0.5 to about 1.5 cellulose ether. Most preferably, the matrix composition contains 2 weight percent carboxymethylcellulose, 9 weight percent starch, 11 weight percent flour, 1 weight percent sugar, 1 weight percent salt, and 1 weight percent cellulose ether.

The matrix composition is admixed with water and the minced or finely chopped food particles to form food mash. The foods which can be used include fish, vegetables such as onions, mushrooms, zuchinni and the like, cheeses, meats or fowl, "egg roll" type products and mixtures thereof. The temperature of water is about 35° to about 70° F. Preferably, the water is about 35° to about 40° F.

Typically the food mash contains from about greater than zero to about 25 weight percent food particles, about 50 to about 80 weight percent water, and 15 to about 40 weight percent of the matrix composition; more preferably about 7 to about 15 weight percent food particles, about 58 to about 67 weight percent water and about 22 to about 30 weight percent matrix composition. Preferably, the mash contains 10 weight percent food particle, 63 weight percent water, and 27 weight percent matrix composition.

The food mash composition is extruded into a shaped form. In order to feed the food mash into the extruder a feed system is designed such that the viscous mash composition is delivered through a die of an extruder at a constant rate. Typically the mash is pumped into an extruder head. Generally, the extruder will have from about 1 to about 10 heads. Preferably, the extruder will have from about 7 to about 10 heads, most preferably about 10 heads. The heads form and extrude the mash composition into the desired shape.

The head is pushed by pressure which is about 3 psi to about 10 psi, preferably about 5 psi into a cylinder. Pump pressure of about 3 to about 10 psi is put on the product which pushes the mash composition to the forming heads. Various extrusion rates can be achieved by varying the pump pressure and the cutting head speed.

After extruding the food composition into a shaped form, the shaped food is contacted with an aluminum solution whereupon the food form gels. The solution comprises aluminum crosslinking agent and water. The aluminum crosslinking agent is water soluble. Generally, the crosslinking agent can be a trivalent aluminum salt such as aluminum sulfate, aluminum potassium sulfate and aluminum sodium sulfate. Generally, the aluminum crosslinking agent comprises from about 1 to about 5 weight percent of the aluminum solution. Preferably, the aluminum crosslinking agent comprises about 2.5 weight percent of the aluminum solution. Generally, the aluminum solution is about 35° F. to about 75° F., preferably, the aluminum solution is about 40° F.

Preferably, the shaped food form is placed directly in the solution bath after extrusion. Although alternatively, the shaped food could be refrigerated and processed at a later time. The solution bath comprising the soluble aluminum salts yields a trivalent ion which reacts with the carboxymethylcellulose. In addition to using an aluminum bath as a means of contacting the shaped food with the solution, one could also spray the solution onto the shaped food form. Other contacting options could also include various forms of dipping the food product in the solution. By exposing the shaped food to the solution, a stable product is formed throughout the matrix and the food product is not enclosed in a skin-like gel.

Typically, the food product is coated with a batter, breading or a glaze and is further processed. Common in the food industry, the food product is repeatedly batter breaded and is subsequently deep fried, although one is not limited to any specific technique. Basically, any of food preparation techniques known in the art could be used after the food product is formed.

EXAMPLES

A. A food matrix formulation is prepared by admixing the ingredients to form a homogeneous blend.

| FOOD MATRIX | By Weight Percent of the Matrix Formula |
|---|---|
| Carboxymethylcellulose | 14.81 |
| Starch | 29.65 |
| Flour | 44.44 |
| Sugar | 3.7 |
| Salt | 3.7 |
| Methylcellulose | 3.7 |

B. An extrudable food mash is prepared by mixing the following ingredients

| FOOD MASH | By Weight Percent of Total Composition |
|---|---|
| Minced dehydrated onions | 10.0 |
| Water at approximately 40° F. | 63.0 |
| Matrix Formula prepared in A | 27.0 |

The mash is prepared by adding the matrix formula to the water and minced or finely chopped food particles, in this instance onions are used. The mash temperature prior to extrusion can be up to about 75° F., but preferably is below 45° F.

C. The mash is introduced to the extrusion heads by pumping with positive displacement pumps. The mash is then forced into the cutting heads, where it is extruded into the appropriate shape, which among others includes ropes, crescents, patties and rings. The extruded shapes are removed from the forming heads by means of a cutting blade, which can be varied to yield different sized shapes. Additionally, the line speed of the process can also be varied. The shaped product is generally bathed in a crosslinking gelling solution as it is extruded, but can be treated after forming and cutting by allowing the pieces to contact the solution after cutting. The trivalent aluminum salt used herein is aluminum sodium sulfate. The extruded piece can then be further treated to coat with a batter or glaze, for frying freezing and the like, or any other combination of desired treatment.

What is claimed is:

1. A manufactured food product comprising an extruded, shaped food product, having a matrix that contains an effective amount of carboxymethylcellulose, food particles, and a gelling binder, where the extruded, shaped food product has been contacted with an aluminum solution thereby gelling the food product so that the food particles are stable throughout the matrix and the shaped food product does not contain a gel-like skin.

2. The product of claim 1, wherein the manufactured food product has an edible coating that is selected from the group consisting of batter, breading, and glaze.

3. The product of claim 1, wherein the gelling binder is a cellulose ether.

4. The product of claim 3, wherein the cellulose ether is selected from the group consisting of methylcellulose, hydroxypropyl methylcellulose, and methylethylcellulose.

5. The product of claim 1, wherein the aluminum solution comprises an aluminum crosslinking agent and water.

6. The product of claim 5, wherein the aluminum crosslinking agent is selected from the group consisting of aluminum sulfate, aluminum potassium sulfate, and aluminum sodium sulfate.

7. The product of claim 5 wherein the aluminum crosslinking agent comprises from about 1 to about 5 weight percent of the aluminum solution.

8. The product of claim 7, wherein the aluminum crosslinking agent comprises 2.5 weight percent of the aluminum solution.

9. The product of claim 1, wherein the matrix comprises from about 1.0 to 5 weight percent carboxymethylcellulose, from about 6 to about 12 weight percent starch, from about 10 to about 14 weight percent flour, from greater than zero to about 3 weight percent sugar, from greater than zero to about 2 weight percent salt and from about 0.25 to about 2 weight percent cellulose ether.

10. The product of claim 9, wherein the matrix comprises from about 1 about 3 weight percent carboxymethylcellulose, about 8 to about 10 weight percent starch, from about 10 to about 11 weight percent flour, from about 0.5 to about 1.5 weight percent sugar, from about 0.5 to about 1.5 weight percent salt, and from about 0.5 to about 1.5 cellulose ether.

11. The product of claim 10, wherein the matrix comprises 2 weight percent carboxymethylcellulose, 9 weight percent starch, 11 weight percent flour, 1 weight percent sugar, 1 weight percent salt, 1 weight percent cellulose ether.

12. The manufactured onion ring product comprising an extruded, shaped onion ring, wherein the onion ring contains an effective amount of carboxymethylcellulose, onion particles, a gelling binder, and said product has been contacted with an aluminum solution.

13. The product of claim 12, wherein the manufactured onion ring product has an edible coating that is selected from the group consisting of batter, breading, and glaze.

14. The manufactured onion product of claim 12, wherein the gelling binder is a cellulose ether.

15. The manufactured onion product of claim 12, wherein the matrix comprises from about 1.0 to 5 weight percent carboxymethylcellulose, from about 6 to about 12 weight percent starch, from about 10 to about 14 weight percent flour, from greater than zero to about 3 weight percent sugar, from greater than zero to about 2 weight percent salt and from about 0.25 to about 2 weight percent cellulose ether.

16. The manufactured onion product of claim 12 wherein the aluminum solution comprises an aluminum crosslinking agent and water.

17. The manufactured onion product of claim 16 wherein the aluminum crosslinking agent is selected from the group consisting of aluminum sulfate, aluminum potassium sulfate, and aluminum sodium sulfate.

18. A method of preparing an extruded, shaped food product comprising:

(a) blending a composition that comprises carboxymethylcellulose, a gelling binder and food particles to form a food mash composition;

(b) extruding the food mash into a desired shape; and (c) exposing the extruded food product to an aluminum solution thereby gelling the food product such that the food particles are stable throughout the food product and the shaped food product does not contain a gel-like skin.

19. The method of claim 18 which further comprises: (d) applying an edible coating onto the extruded food shape, thereby forming an edible food product wherein, an edible coating is selected from the group consisting of batter, breading, and glaze.

20. The method of claim 18, wherein the aluminum solution comprises an aluminum crosslinking agent and water.

21. The method of claim 20, wherein the aluminum crosslinking agent is selected from the group consisting of aluminum sulfate, aluminum potassium sulfate and aluminum sodium sulfate.

22. The method of claim 18, wherein the extruded food composition is coated with the aluminum solution by spraying the solution onto the said composition.

23. The method of claim 18, wherein the extruded food composition is coated with the aluminum solution by placing the extruded food form in a bath of an aluminum solution.

24. The method of claim 18, wherein the extruded food particles comprising the food mash are comminuted onions.

* * * * *